E. J. FRASER.
Wheel-Plow.
No. 30,136.
Patented Sept. 25, 1860.
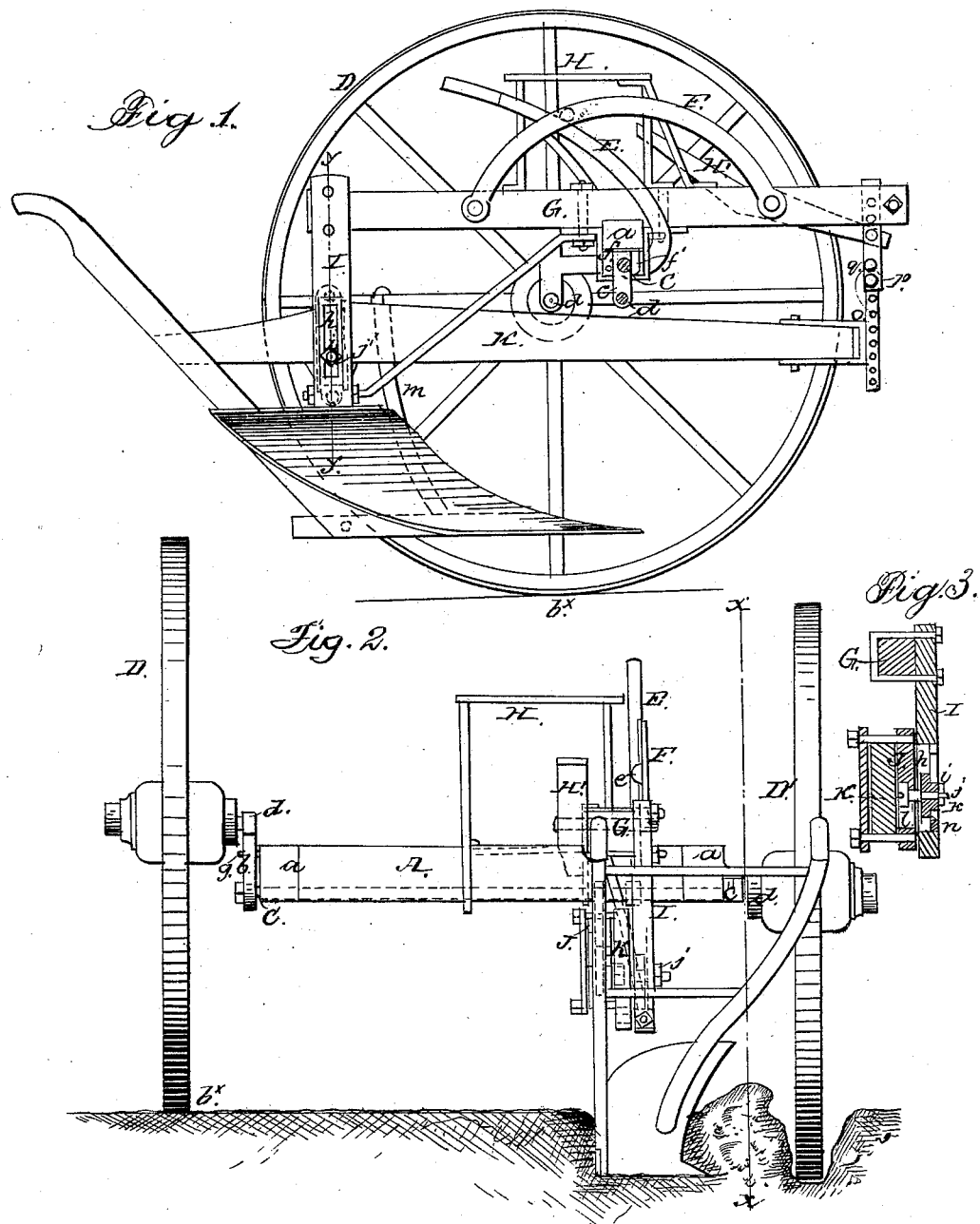
WITNESSES:
INVENTOR:

UNITED STATES PATENT OFFICE.

EDWIN J. FRASER, OF KANSAS CITY, MISSOURI.

IMPROVEMENT IN PLOWS.

Specification forming part of Letters Patent No. 30,136, dated September 25, 1860.

*To all whom it may concern:*

Be it known that I, EDWIN J. FRASER, of Kansas City, in the county of Jackson and State of Missouri, have invented a new and Improved Plow; and I do hereby declare that the following is a full, clear, and exact description of the same, reference being had to the annexed drawings, making a part of this specification, in which—

Figure 1 is a side sectional elevation of my invention, $x\,x$, Fig. 2, indicating the plane of section; Fig. 2, a back view of the same; Fig. 3, a transverse vertical section of the same, taken in the line $y\,y$, Fig. 1.

Similar letters of reference indicate corresponding parts in the several figures.

This invention relates to certain improvements in that class of plows which are connected with wheels and are frequently termed "sulky-plows."

To enable those skilled in the art to fully understand and construct my invention, I will proceed to describe it.

A represents the wooden bed of the axle, and C the axle proper, the latter being an iron shaft fitted in a longitudinal recess in the under side of the bed and secured in bearings $a\,a$, the axle being allowed to turn in its bearings. The ends of the axle C are provided respectively with cranks $b\,c$, one of which has a position at right angles to that of the other, as shown clearly in Fig. 1, and each crank is provided with an arm, $d$, on which the wheels D D' are placed.

To the axle C a bent or curved lever, E, is attached, said lever extending backward over the bed A and by the side of a segment, F, which is secured vertically to a bar, G, attached at right angles to the bed A, near the wheel D'. The segment F is provided with a stop, $e$, which retains the lever E when drawn back to the extent of its movement.

The bearings $a\,a$ are metal sockets fitted on the ends of the axle-bed A, and the socket at the off end of the bed has a horizontal projection, $f$, which serves as a bearing for the crank $c$ when the latter is in a horizontal position, and in the projection $f$ there is driven a pin, $f'$, which serves as a bearing for the crank $c$ when the latter is in a vertical position. The other bearing $a$ has a pin, $g$, projecting horizontally from it, said pin serving as a bearing for the crank $b$ when the latter is in a vertical position.

On the bed A and bar G the driver's seat H is secured, and to the back end of the bar G there is attached a pendent bar, I, which has a vertical slot, $h$, made in it, and in which a slide, $i$, is placed and secured at any desired point by a screw-bolt, $j$, the head $k$ of which projects laterally from the slide, so that it may be fitted in a slot, $l$, in a metal clip, J, which encompasses a plow-beam, K, the clip being near the standard $m$ of the plow. The slot $l$ is provided at its upper part with flanges $n$, one at each side, behind which the head $k$ of the screw passes and forms a connection between the pendent bar I and the plow-beam. (See Fig. 3.) The front end of the beam K has a clevis, $o$, attached, said clevis having its front end provided with a series of perforations, through either of which a bolt, $p$, passes, which secures the front end of the beam to a pendant, $q$, which rests on the bar G.

To the bar G a treadle, H', is attached, and the front end of this treadle is connected to the pendant $q$. The pendent bar I, at the back end of the bar G, is braced by a rod, $r$, as shown clearly in Fig. 1. The plow connected with the beam K may be of the usual turning-mold-board form, and therefore does not require a minute description. The bar G is to extend sufficiently forward to form the draft-pole. The driver is on the seat H, and an attendant holds the plow. As the implement is drawn along, and when at its work, the lever E is allowed to extend forward, it not being held by stop $e$, and the cranks $b\,c$ of the axle C will assume the position shown in Fig. 2—to wit, the crank $c$ being in a horizontal position and bearing against the projection $f$, and the crank $b$ being in a vertical position and bearing against the pin $g$. This position of the cranks $b\,c$ causes the wheel D' to be lower than the wheel D, and admits of the former running in the furrow $a^\times$, and the latter running on the unplowed surface $b^\times$, while the axle and plow are kept in a horizontal and proper working position. (See Fig. 2.)

In turning the machine at the ends of a field, or in transporting it from place to place, the driver, by merely drawing back the upper end of lever E, will turn the axle C and reverse the position of the cranks, the crank $c$ being turned to a vertical position and crank $b$ to a horizontal one. The movements of the cranks elevate the plow so that its share will be above the surface of the ground, and at the same time the wheels D D' are adjusted to a common level with their axle C in a horizontal position.

The whole arrangement is extremely simple and efficient. The plow-beam K may be easily attached to and disconnected from the pendent bar I, and at any time when it is necessary to elevate the plowshare to allow the same to pass over obstructions it may be done by simply depressing the inner end of treadle H', the driver doing this with his foot.

I do not claim the axle C; but,

Having thus described my invention, what I claim as new, and desire to secure by Letters Patent, is—

Connecting the plow-beam K to the bar G through the medium of the pendent bar I, provided with the slide $i$ and bolt $k$, in connection with the clip J, attached to the plow-beam K, and provided with the slot $l$, substantially as described.

EDWIN J. FRASER.

Witnesses:
J. A. BOARMAN,
JO THOME.